US012729342B2

(12) United States Patent
Liu et al.

(10) Patent No.: US 12,729,342 B2
(45) Date of Patent: Sep. 8, 2026

(54) CATALYTIC CRACKING OF BIO FEEDSTOCKS AND WASTE PLASTICS WITH DEACTIVATED PHOSPHORUS-CONTAINING ZSM-5 CATALYST

(71) Applicant: Chevron U.S.A. Inc., San Ramon, CA (US)

(72) Inventors: Tengfei Liu, Fairfield, CA (US); Joel Edward Schmidt, Oakland, CA (US); Richard L. Grove, Spanish Fort, AL (US)

(73) Assignee: CHEVRON U.S.A. INC., San Ramon, CA (US)

( * ) Notice: Subject to any disclaimer, the term of this patent is extended or adjusted under 35 U.S.C. 154(b) by 202 days.

(21) Appl. No.: 18/804,600

(22) Filed: Aug. 14, 2024

(65) Prior Publication Data

US 2026/0049250 A1 Feb. 19, 2026

(51) Int. Cl.

| | |
|---|---|
| ***C10G 11/05*** | (2006.01) |
| ***B01J 29/40*** | (2006.01) |
| ***B01J 37/00*** | (2006.01) |
| ***B01J 37/28*** | (2006.01) |

(52) U.S. Cl.

CPC ............... *C10G 11/05* (2013.01); *B01J 29/40* (2013.01); *B01J 37/0009* (2013.01); *B01J 37/28* (2013.01); *B01J 2229/36* (2013.01); *C10G 2300/1003* (2013.01)

(58) Field of Classification Search

CPC .. C10G 11/05; C10G 2300/1003; C10G 3/49; C10G 11/18; C10G 2300/1011; C10G 2400/20; C10G 2400/22; C10G 2400/30; C10G 1/10; B01J 29/40; B01J 37/0009; B01J 37/28; B01J 2229/36

USPC .......................................................... 585/241

See application file for complete search history.

(56) References Cited

U.S. PATENT DOCUMENTS

2012/0215043 A1* 8/2012 Gaffney .................... B01J 37/06 502/64
2023/0137243 A1* 5/2023 Liu ........................... B01J 29/40 585/469

OTHER PUBLICATIONS

PCT/US2025/035349, International Search Report, Oct. 28, 2025, 15 pages.

Zhiwei Wang et al, "Co-pyrolysis of waste plastic and solid biomass for synergistic production of biofuels and chemicals—A review", Progress in Energy and Combustion Science, May 1, 2021, 52 pages, vol. 84.

Weikun Yao et al, "Thermally stable phosphorus and nickel modified ZSM-5 zeolites for catalytic co-pyrolysis of biomass and plastics", RSC Advances, Jan. 1, 2015, pp. 30485-30494, vol. 5, No. 39.

Kanduri Praveen Kumar et al, "Catalytic Co-pyrolysis of Biomass and Plastics (Polypropylene and Polystyrene) Using Spent FCC Catalyst", Energy & Fuels, Dec. 10, 2019, pp. 460-473, vol. 34, No. 1.

Nguyen Le-Phuc et al, "High-efficient production of biofuels using spent fluid catalytic cracking (FCC) catalysts and high acid value waste cooking oils", Renewable Energy, Dec. 15, 2020, pp. 57-63, vol. 168.

* cited by examiner

*Primary Examiner* — Prem C Singh
*Assistant Examiner* — Francis C Campanell
(74) *Attorney, Agent, or Firm* — Michael E. Carmen; Terrence M. Flaherty

(57) ABSTRACT

A process includes contacting one or more bio feedstocks and one or more waste plastic feedstocks with a deactivated cracking catalyst comprising a phosphorus-containing ZSM-5 catalyst at catalytic cracking conditions to obtain a product stream containing hydrocarbons, and separating at least one hydrocarbon fraction from the product stream, wherein the deactivated cracking catalyst contains at least one metal contaminant.

20 Claims, No Drawings

CATALYTIC CRACKING OF BIO FEEDSTOCKS AND WASTE PLASTICS WITH DEACTIVATED PHOSPHORUS-CONTAINING ZSM-5 CATALYST

BACKGROUND

There is an increasing interest in alternative feedstocks for replacing at least partly crude oil, in the production of hydrocarbons suitable as chemical products and/or fuels. Biofuels are typically manufactured from feedstock originating from bio feedstock sources including oils and fats obtained from plants, animals, algal materials, fish, and various waste streams, side streams and sewage sludge. These feedstocks, particularly the various waste streams and side streams, contain varying amounts of contaminants, such as gums, organic chlorine compounds, phospholipids and other phosphorus compounds, metals and metal compounds, and residual soaps, which are, for example, deleterious to converting catalysts.

In addition, the world has seen extremely rapid growth of plastics production. According to Plastics Europe Market Research Group, the world plastics production was 335 million tons in 2016, 348 million tons in 2017, 359 million tons in 2018, and 367 million tons in 2020. According to McKinsey & Company, the global plastics-waste volume is estimated to be 460 million tons per year by 2030 if the current trajectory continues.

Single use waste plastic has become an increasingly important environmental issue. At the moment, there appear to be few options for recycling waste plastics such as, for example, polyethylene and polypropylene waste plastics, to value-added chemical and fuel products. Presently, only a small amount of polyethylene/polypropylene waste plastic is recycled via chemical recycling, where recycled and cleaned plastic pellets are pyrolyzed in a pyrolysis unit to make fuels (naphtha, diesel), steam cracker feed or slack wax. The majority, greater than 80%, is incinerated, land filled or discarded.

SUMMARY

In accordance with an illustrative embodiment, a process comprises:

- contacting one or more bio feedstocks and one or more waste plastic feedstocks with a deactivated cracking catalyst comprising a phosphorus-containing ZSM-5 catalyst at catalytic cracking conditions to obtain a product stream comprising hydrocarbons, and
- separating at least one hydrocarbon fraction from the product stream, wherein the deactivated cracking catalyst contains at least one metal contaminant.

DETAILED DESCRIPTION

Various illustrative embodiments described herein are directed to processes for catalytic cracking one or more bio feedstocks and one or more waste plastic feedstocks. As mentioned above, there is an increasing interest in alternative feedstocks for replacing at least partly crude oil, in the production of hydrocarbons suitable as chemical products and/or fuels.

Bio feedstocks and waste plastics typically contain contaminants, such as calcium, magnesium, chlorides, nitrogen, sulfur, dienes, and heavy components, and these products cannot be used in a large quantity for blending in transportation fuels. In order to diminish this negative impact, the bio feedstocks and waste plastics go through the refinery units where the contaminants can be captured in pre-treating units such as a hydrotreating unit. This, however, increases the carbon intensity of the pre-treated waste plastic and bio feedstock.

Presently, catalytic cracking, and particularly fluidized catalytic cracking (FCC), is routinely used to convert heavy hydrocarbon feedstocks to lighter products, such as gasoline and distillate range fractions. The high levels of contaminants such as metals in the bio feedstocks and waste plastics may deactivate the FCC catalysts. Thus, the bio feedstocks and waste plastics must be pre-treated before the catalytic cracking process to remove the contaminants. As discussed above, this results in the pre-treated bio feedstocks and waste plastics having a higher carbon intensity relative to the untreated bio feedstocks and waste plastics.

According to the present disclosure, it has now been found that phosphorus-containing ZSM-5 catalysts can maintain their activity as a base catalyst for catalytic cracking of untreated bio feedstocks and waste plastics despite undergoing deactivation from the contaminants such as at least one metal contaminant in the bio feedstocks and waste plastics, exhibiting surprisingly high yields of light olefins and aromatics-enriched naphtha, as well improving the octane of the gasoline fraction relative to conventional large-pore FCC catalysts. This, in turn, avoids the use of any pre-treatment steps of the bio feedstocks and waste plastics to remove the contaminants prior to the catalytic cracking process. In this manner, the bio feedstocks and waste plastics used in the catalytic cracking process of the present disclosure are lower carbon intensity bio feedstocks and waste plastics relative to the pre-treated bio feedstocks and waste plastics. Another advantage is that the catalytic cracking process of the present disclosure is a lower cost process by eliminating the need to pre-treat the bio feedstocks and waste plastics to remove the contaminants prior to the catalytic cracking process.

Definitions

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology can be applied, as long as that definition does not conflict with any other disclosure or definition applied herein or render indefinite or non-enabled any claim to which that definition is applied. To the extent that any definition or usage provided by any document incorporated herein by reference conflicts with the definition or usage provided herein, the definition or usage provided herein controls.

As used in this disclosure the word “comprises” or “comprising” is intended as an open-ended transition meaning the inclusion of the named elements, but not necessarily excluding other unnamed elements. The phrase “consists essentially of” or “consisting essentially of” is intended to mean the exclusion of other elements of any essential significance to the composition. The phrase “consisting of” or “consists of” is intended as a transition meaning the exclusion of all but the recited elements with the exception of only minor traces of impurities.

The terms “a,” “an,” and “the” are intended to include plural alternatives, e.g., at least one. The terms “including,”

"with," and "having," as used herein, are defined as comprising (i.e., open language), unless specified otherwise.

Various numerical ranges are disclosed herein. When Applicant discloses or claims a range of any type, Applicant's intent is to disclose or claim individually each possible number that such a range could reasonably encompass, including end points of the range as well as any sub-ranges and combinations of sub-ranges encompassed therein, unless otherwise specified. For example, all numerical end points of ranges disclosed herein are approximate, unless excluded by proviso.

Values or ranges may be expressed herein as "about," from "about" one particular value, and/or to "about" another particular value. When such values or ranges are expressed, other embodiments disclosed include the specific value recited, from the one particular value, and/or to the other particular value. Similarly, when values are expressed as approximations, by use of the antecedent "about," it will be understood that the particular value forms another embodiment. It will be further understood that there are a number of values disclosed therein, and that each value is also herein disclosed as "about" that particular value in addition to the value itself. In another aspect, use of the term "about" means±20% of the stated value, ±15% of the stated value, ±10% of the stated value, ±5% of the stated value, ±3% of the stated value, or ±1% of the stated value.

The term "bio" refers to biochemical and/or natural chemicals found in nature. Thus, a bio feedstock or bio-oil would comprise such natural chemicals. The preferred starting bio feedstocks for the blend preparation include triglycerides and fatty acids, plant-derived oils.

The term "municipal solid waste" as used herein refers to nonliquid waste that comes from homes, institutions, and small businesses.

The term "waste plastic" as used herein refers to any post-industrial (or pre-consumer) and post-consumer plastics, such as, for example, one or more polyesters, one or more polyolefins (PO), and/or polyvinylchloride (PVC).

The term "post-industrial plastic" (or "pre-consumer" plastic) as used herein includes all manufactured recyclable organic plastics that are not post-consumer plastics, such as a material that has been created or processed by a manufacturer and has not been used for its intended application, has not been sold to the end use customer, or has been discarded or transferred by a manufacturer or any other entity engaged in the sale or disposal of the material.

The term "post-consumer plastic" as used herein refers to a plastic that has been used at least once for its intended application for any duration of time regardless of wear, has been sold to an end use customer, or has been discarded into a recycle bin by any person or entity other than a manufacturer or business engaged in the manufacture or sale of the material. Examples of post-industrial or pre-consumer plastics include rework, regrind, scrap, trim, out of specification materials, and finished materials transferred from a manufacturer to any downstream customer (e.g., manufacturer to wholesaler to distributor) but not yet used or sold to the end use customer.

The term "virgin" denotes the newly produced materials and/or objects prior to their first use, which have not already been recycled.

A "fresh catalyst" as used herein denotes a catalyst which has not previously been used in a catalytic process.

The term "deactivated catalyst" denotes any catalyst that has less activity at the same reaction conditions (e.g., temperature, pressure, inlet flows) than the catalyst had when it was originally exposed to the process. This can be due to a number of reasons, several non-limiting examples of causes of catalyst deactivation are coking or carbonaceous material sorption or accumulation, metals (and ash) sorption or accumulation, attrition, morphological changes including changes in pore sizes, cation or anion substitution, and/or chemical or compositional changes which may include loss of acidity.

The term "large-pore" means a molecular sieve framework having a maximum ring size of at least 12 tetrahedral atoms, "medium-pore" means a molecular sieve framework having a maximum ring size of at least 10 tetrahedral atoms, and the term "small-pore" means a molecular sieve framework having a maximum ring size of at least 8 tetrahedral atoms.

The term "hydrocarbon" refers to a class of compounds containing hydrogen bound to carbon, and encompasses (i) saturated hydrocarbon compounds, (ii) unsaturated hydrocarbon compounds, and (iii) mixtures of hydrocarbon compounds (saturated and/or unsaturated), including mixtures of hydrocarbon compounds having different numbers of carbon atoms.

The term "Cn", wherein "n" is an integer, means hydrocarbons having "n" number of carbon atoms. The term "Cn+", wherein "n" is an integer, means hydrocarbons having "n" or more carbon atoms. The term "Cn−", wherein "n" is an integer, means hydrocarbons having "n" or fewer carbon atoms. The term "Cn=" means alkenes having "n" carbon atoms.

The term "octane number" refers to the percentage of iso-octane in a mixture of iso-octane and n-heptane that would have the same knock resistance as the presently tested fuel, according to ASTM D2699 and D2700. Octane numbers typically range from 0 to 100, with higher values indicating better fuel performance. Octane numbers are unitless.

The term "Research Octane Number" (RON) refers to the octane number obtained by testing at lower engine speed and temperature, typically about 600 rpm, according to ASTM D2699.

The term "Motor Octane Number" (MON) refers to the octane number obtained by testing at higher engine speed and temperature, typically about 900 rpm according to ASTM D2700. Given that engine inefficiency inherently increases as temperature increases, RON is typically higher than MON.

"Anti-knock index" is defined by the arithmetic average of the two octane numbers: (RON+MON)/2.

The term "wt. %" refers to a weight percentage of a component based on the total weight of material that includes the component. In a non-limiting example, 10 grams of component in 100 grams of the material are 10 wt. % of component.

Applicant reserves the right to proviso out or exclude any individual members of any such group of values or ranges, including any sub-ranges or combinations of sub-ranges within the group, that can be claimed according to a range or in any similar manner, if for any reason Applicant chooses to claim less than the full measure of the disclosure, for example, to account for a reference that Applicant may be unaware of at the time of the filing of the application. Further, Applicant reserves the right to proviso out or exclude any members of a claimed group.

Although any processes and materials similar or equivalent to those described herein can be used in the practice or testing of the illustrative embodiments described herein, the typical processes and materials are herein described.

The illustrative embodiments described herein overcome the drawbacks discussed above and provide an improved process for contacting one or more bio feedstocks and one or more waste plastic feedstocks with a deactivated cracking catalyst comprising a phosphorus-containing ZSM-5 catalyst at catalytic cracking conditions to obtain a product stream comprising hydrocarbons, and separating at least one hydrocarbon fraction from the product stream, wherein the deactivated cracking catalyst contains at least one metal contaminant.

Feed

The feed for processing in the presence of a deactivated cracking catalyst comprising a phosphorus-containing ZSM-5 catalyst under catalytic cracking conditions to obtain a product stream comprising hydrocarbons includes one or more bio feedstocks and one or more waste plastic feedstocks.

The one or more bio feedstocks may originate from any renewable or biological source or sources, and is meant to include herein feedstocks other than those obtained from, for example, mineral oil, shale oil or coal.

In an illustrative embodiment, the one or more bio feedstocks may originate from any renewable source such as, for example, from any type of plant, animal, microorganism such as algae (e.g., algae oil, algae biomass, algae cultivation), fish and microbiological process.

In some embodiments, the one or more bio feedstocks comprises plant-derived oils and/or animal-derived fats and oils.

Many different bio feedstock sources derived from plants can be used. In non-limiting illustrative embodiments, plant-based bio feedstock sources include, for example, rapeseed oil, soybean oil (including degummed soybean oil), canola oil, cottonseed oil, grape seed oil, mustard seed oil, corn oil, linseed oil, safflower oil, sunflower oil, poppy-seed oil, pecan oil, walnut oil, oat oil, peanut oil, rice bran oil, *camellia* oil, castor oil, and olive oil, palm oil, coconut oil, rice oil, algae oil, seaweed oil, Chinese Tallow tree oil. Other plant-based bio feedstock sources can be obtained from, for example, argan, avocado, babassu palm, balanites, borneo tallow nut, brazil nut, calendula, camelina, caryocar, cashew nut, Chinese vegetable tallow, cocoa, coffee, cohune palm, coriander, cucurbitaceae, *euphorbia*, hemp, illipe, jatropha, jojoba, kenaf, kusum, macadamia nuts, mango seed, noog *abyssinia*, nutmeg, opium poppy, *perilla*, pili nut, pumpkin seed, rice bran, sacha inche, seje, sesame, shea nut, teasel, allanblackia, almond, chaulmoogra, *cuphea*, jatropa curgas, karanja seed, neem, *papaya*, tonka bean, tung, and ucuuba, cajuput, clausena anisata, davana, *galbanum* natural oleoresin, German chamomile, hexastylis, high-geraniol monarda, juniapa-hinojo sabalero, lupine, *Melissa officinalis*, milfoil, ninde, patchouli, tarragon, and wormwood.

Many different bio feedstock sources derived from animals can also be used. In non-limiting illustrative embodiments, animal-based bio feedstock sources can include, for example, choice white grease, lard (pork fat), tallow (beef fat), fish oil, and poultry fat.

Many different bio feedstock sources derived from microorganisms (e.g., Eukaryotes, Eubacteria and Archaea) can also be used. In non-limiting illustrative embodiments, microbe-based bio feedstock sources include, for example, the L-glycerol lipids of Archaea and algae and diatom oils. In some embodiments, bio feedstock sources derived from microorganisms can include bacteria, protozoa, algae, and fungi.

In some embodiments, bio feedstock sources derived from both plant and animal sources can be used such as, for example, yellow grease, white grease, and brown grease. In non-limiting illustrative embodiments, yellow, white or brown grease can include frying oils from deep fryers and can thus include fats of both plant and animal origin. Bio feedstock sources can specifically include used cooking oil.

In an illustrative embodiment, the one or more bio feedstocks can be derived from a biological raw material component such as a vegetable oil, animal fat, and algae oil. The common feature of these sources is that they are composed of glycerides and free fatty acids (FFAs). Both of these classes of compounds contain aliphatic carbon chains having from about 8 to about 24 carbon atoms. The aliphatic carbon chains in the glycerides or FFAs can be saturated or mono-, di- or poly-unsaturated aliphatic carbon atoms.

Accordingly, in an illustrative embodiment, the one or more bio feedstocks that can be used herein include any of those which comprise glycerides and FFAs. In one embodiment, the glycerides will contain a majority of triglycerides; however, monoglycerides and diglycerides may be present and processed as well. In an illustrative embodiment, the one or more bio feedstocks can contain at least about 10 wt. % triglycerides. In an illustrative embodiment, the one or more bio feedstocks can contain at least about 25 wt. % triglycerides. In an illustrative embodiment, the one or more bio feedstocks can contain at least about 50 wt. % triglycerides. In an illustrative embodiment, the one or more bio feedstocks can contain at least about 75 wt. % triglycerides. In an illustrative embodiment, the one or more bio feedstocks can contain at least about 90 wt. % triglycerides. In an illustrative embodiment, the one or more bio feedstocks can contain 100 wt. % triglycerides.

Suitable vegetable oils include, for example, castor oil, canola oil, coconut oil, corn oil, cottonseed oil, jatropha oil, linseed oil, mustard oil, olive oil, palm oil, palm kernel oil, peanut oil, rapeseed oil, safflower oil, sesame oil, soybean oil, and sunflower oil. Suitable vegetable oils can also include processed vegetable oil materials such as the fatty acids and fatty acid ($C_1$ to $C_5$) alkyl esters derived from vegetable oils.

Representative examples of animal fats include beef fat (tallow), hog fat (lard), poultry fat, and fish oil. Useful animal fats can also include processed animal fat materials such as the fatty acids and fatty acid ($C_1$ to $C_5$) alkyl esters derived from animal fats.

In an illustrative embodiment, as may be combined with one or more of the preceding paragraphs, the one or more bio feedstocks can also contain impurities. These impurities can include gums (e.g., phospholipids), suspended solids, and metals (e.g., Na, K, Mg, Ca, Mn, Fe, Cu, Zn). In some embodiments, the metal contaminants, non-metal contaminants, and halides can be present in the one or more bio feedstocks in an amount of greater than or equal to about 1 part per million (ppm), e.g., from about 1 to about 10 ppm or up to about 100 ppm. In some embodiments, the metal contaminants can be present in the one or more bio feedstocks in an amount of greater than or equal to about 10 ppm, e.g., from about 10 to about 100 ppm.

The waste plastic may originate from one or more of several sources. In an illustrative embodiment, as may be combined with one or more of the preceding paragraphs, the waste plastic may originate from, for example, plastic bottles, diapers, eyeglass frames, films, packaging materials, carpet (residential, commercial, and/or automotive), textiles (clothing and other fabrics) and combinations thereof. This list is merely illustrative, and any source of waste plastic is contemplated herein.

In an illustrative embodiment, as may be combined with one or more of the preceding paragraphs, a waste plastic includes, for example, high density polyethylene (HDPE), low density polyethylene (LDPE), high molecular weight polyethylene (HMWPE), low molecular weight polyethylene (LMWPE), polypropylene (PP), polystyrene (PS) and mixed plastics, e.g., a mixture of polyethylene (PE), polypropylene (PP), and polystyrene (PS) or a mixture of LDPE, HDPE and PP.

In an illustrative embodiment, a high-density polyethylene has a number average molecular weight of about 100,000 to about 250,000. In an illustrative embodiment, an ultra-high molecular weight polyethylene can have a number average molecular weight of at least about 500,000. In an illustrative embodiment, a high molecular weight polyethylene can have a number average molecular weight of from about 50,000 to about 400,000. In an illustrative embodiment, a low molecular weight polyethylene can have a number average molecular weight of from about 5,000 to about 50,000. In an illustrative embodiment, a high molecular weight polypropylene can have a number average molecular weight of from about 100,000 to about 700,000. In an illustrative embodiment, a high molecular weight polypropylene can have a weight average molecular weight of from about 220,000 to about 700,000. In an illustrative embodiment, a low molecular weight polypropylene can have a number average molecular weight of from about 10,000 to about 100,000.

In an illustrative embodiment, as may be combined with one or more of the preceding paragraphs, the one or more waste plastic feedstocks can comprise at least about 50, or at least about 55, or at least about 60, or at least about 65, or at least about 70, or at least about 75, or at least about 80, or at least about 85, or at least about 95, or at least about 99 weight percent of, for example, polyolefins such as high density polyethylene (HDPE), low density polyethylene (LDPE), ultra-high molecular weight polyethylene, and polypropylene (PP), polyvinyl chloride (PVC), polyvinylidene chloride (PVDC), polyesters such as polyethylene terephthalate (PET), copolyesters and terephthalate copolyesters (e.g., containing residues of TMCD, CHDM, propylene glycol, or NPG monomers), polyamides, poly(methyl methacrylate), polytetrafluoroethylene, acrylonitrile-butadiene-styrene (ABS), polyurethanes, cellulose and derivatives thereof (e.g., cellulose diacetate, cellulose triacetate, or regenerated cellulose), epoxy, phenolic resins, polyacetal, polycarbonates, polyphenylene-based alloys, polystyrene, styrenic compounds, vinyl based compounds, styrene acrylonitrile, polyvinyl acetals (e.g., polyvinyl butyral or PVB), urea based polymers, melamine containing polymers, thermosetting, thermoplastic elastomers other than tires, and/or elastomeric plastics and the like and combinations thereof.

Examples of polyesters may include, but are not limited to, those having repeating aromatic or cyclic units such as those containing a repeating terephthalate, isophthalate, or naphthalate units such as polyethylene terephthalate (PET), modified PET, or those containing repeating furanate repeating units. As used herein, "PET" or "polyethylene terephthalate" refers to a homopolymer of polyethylene terephthalate, or to a polyethylene terephthalate modified with one or more acid and/or glycol modifiers and/or containing residues or moieties of other than ethylene glycol and terephthalic acid, such as isophthalic acid, 1,4-cyclohexanedicarboxylic acid, diethylene glycol, 2,2,4,4-tetramethyl-1,3-cyclobutanediol (TMCD), cyclohexanedimethanol (CHDM), propylene glycol, isosorbide, 1,4-butanediol, 1,3-propane diol, and/or neopentyl glycol (NPG).

Also included within the definition of the terms "PET" and "polyethylene terephthalate" are polyesters having repeating terephthalate units (whether or not they contain repeating ethylene glycol-based units) and one or more residues or moieties of a glycol including, for example, TMCD, CHDM, propylene glycol, or NPG, isosorbide, 1,4-butanediol, 1,3-propane diol, and/or diethylene glycol, or combinations thereof. Examples of polymers with repeat terephthalate units can include, but are not limited to, polypropylene terephthalate, polybutylene terephthalate, and copolyesters thereof. Examples of aliphatic polyesters can include, but are not limited to, polylactic acid (PLA), polyglycolic acid, polycaprolactones, and polyethylene adipates. The polymer may comprise mixed aliphatic-aromatic copolyesters including, for example, mixed terephthalates/adipates.

In an illustrative embodiment, as may be combined with one or more of the preceding paragraphs, the waste plastic may comprise terephthalate repeating units in an amount of at least about 1, at least about 5, at least about 10, at least about 15, at least about 20, at least about 25, at least about 30, at least about 35, at least about 40, or at least about 45 and/or not more than about 75, not more than about 70, not more than about 60, or not more than about 65 weight percent, based on the total weight of the plastic in the waste plastic stream, or it may include terephthalate repeat units in an amount in the range of from about 1 to about 75 weight percent, about 5 to about 70 weight percent, or about 25 to about 75 weight percent, based on the total weight of the stream.

Examples of polyolefins may include, but are not limited to, high density polyethylene (HDPE), low density polyethylene (LDPE), high molecular weight polyethylene (HMWPE), low molecular weight polyethylene (LMWPE), polypropylene (PP), atactic polypropylene, isotactic polypropylene, syndiotactic polypropylene, crosslinked polyethylene, amorphous polyolefins, and the copolymers of any one of the aforementioned polyolefins. In an illustrative embodiment, as may be combined with one or more of the preceding paragraphs, the waste plastic may include polymers including linear low-density polyethylene (LLDPE), polymethylpentene, polybutene-1, and copolymers thereof. In an embodiment, the waste plastic may comprise flashspun high-density polyethylene.

In an illustrative embodiment, as may be combined with one or more of the preceding paragraphs, the one or more waste plastic feedstocks can include, for example, thermosetting, thermoplastic, and/or elastomeric plastics. For example, the number average molecular weight of the thermosetting, thermoplastic, and/or elastomeric plastics can be at least about 300, or at least about 500, or at least about 1000, or at least about 5,000, or at least about 10,000, or at least about 20,000, or at least about 30,000, or at least about 50,000 or at least about 70,000 or at least about 90,000 or at least about 100,000, or at least about 130,000 and up to about 300,000, or up to about 200,000, or up to about 150,000, or up to about 100,000, or up to about 90,000, or up to about 70,000, or up to about 50,000, or up to about 30,000, or up to about 20,000, or up to about 10,000, or up to about 5,000, or up to about 1,000.

Examples of cellulose materials include, but are not limited to, cellulose acetate, cellulose diacetate, cellulose triacetate, cellulose acetate propionate, cellulose acetate butyrate, as well as regenerated cellulose such as viscose. Additionally, the cellulose materials can include cellulose derivatives having an acyl degree of substitution of less than about 3, not more than about 2.9, not more than about 2.8, not more than about 2.7, or not more than about 2.6 and/or at least about 1.7, at least about 1.8, or at least about 1.9.

In an illustrative embodiment, as may be combined with one or more of the preceding paragraphs, a waste plastic may include a mixed plastic waste ("MPW") containing any combination of the foregoing waste plastics.

In an illustrative embodiment, as may be combined with one or more of the preceding paragraphs, the one or more waste plastic feedstocks can be any organic synthetic polymer that is solid at 25° C. at 1 atm. For example, in an illustrative embodiment, the organic synthetic polymers that are solid at 25° C. and 1 atmosphere of pressure may have a number average molecular weight ($M_n$) of at least about 300, or at least about 500, or at least about 1000, or at least about 5,000, or at least about 10,000, or at least about 20,000, or at least about 30,000, or at least about 50,000 or at least about 70,000 or at least about 90,000 or at least about 100,000 or at least about 130,000, or at least about 150,000 Daltons. The weight average molecular weight ($M_w$) of the polymers can be at least about 300, or at least about 500, or at least about 1000, or at least about 5,000, or at least about 10,000, or at least about 20,000, or at least about 30,000 or at least about 50,000, or at least about 70,000, or at least about 90,000, or at least about 100,000, or at least about 130,000, or at least about 150,000, or at least about 300,000 or at least about 400,000 Daltons. In an embodiment or in combination with any embodiment mentioned herein, the polymers have an average molecular weight, $M_w$, in the range of about 5,000 to about 150,000. In an embodiment or in combination with any embodiment mentioned herein, the polymers have an average molecular weight, $M_w$, in the range of greater than about 150,000 to about 400,000.

In an illustrative embodiment, as may be combined with one or more of the preceding paragraphs, the form of the one or more waste plastic feedstocks can include any of the forms of articles, products, materials, or portions thereof. For example, a portion of an article can take the form of sheets, extruded shapes, moldings, films, carpet, laminates, foam pieces, chips, flakes, particles, agglomerates, briquettes, powder, shredded pieces, long strips, randomly shaped pieces having a wide variety of shapes, or any other form other than the original form of the article and adapted to feed to the FCC unit discussed hereinbelow.

In an illustrative embodiment, as may be combined with one or more of the preceding paragraphs, the one or more waste plastic feedstocks can be in the form of solid particles, such as chips, flakes, or a powder. In another embodiment, the one or more waste plastic feedstocks may comprise particulates such as, for example, shredded plastic particles, chopped plastic particles, or plastic pellets.

In an illustrative embodiment, as may be combined with one or more of the preceding paragraphs, the one or more waste plastic feedstocks can include at least about 50, or at least about 55, or at least about 60, or at least about 65, or at least about 70, or at least about 75, or at least about 80, or at least about 85, or at least about 95, or at least about 99 weight percent of recycled textiles and/or recycled carpet, such as synthetic fibers, rovings, yarns, nonwoven webs, cloth, fabrics and products made from or containing any of the aforementioned plastics. The textiles can include woven, knitted, knotted, stitched, tufted, felted, embroidered, laced, crocheted, braided, or nonwoven webs and materials. The textiles can include fabrics, fibers separated from a textile or other product containing fibers, scrap or off spec fibers or yarns or fabrics, or any other source of loose fibers and yarns. Furthermore, the textiles may also include staple fibers, continuous fibers, threads, tow bands, twisted and/or spun yarns, grey fabrics made from yarns, finished fabrics produced by wet processing gray fabrics, garments made from the finished fabrics, or any other fabrics. Textiles include apparels, interior furnishings, and industrial types of textiles. Textiles also include post-industrial textiles or post-consumer textiles or both.

Examples of textiles in the apparel category (things humans wear or made for the body) include, but are not limited to, sports coats, suits, trousers and casual or work pants, shirts, socks, sportswear, dresses, intimate apparel, outerwear such as rain jackets, cold temperature jackets and coats, sweaters, protective clothing, uniforms, and accessories such as scarves, hats, and gloves. Examples of textiles in the interior furnishing category include furniture upholstery and slipcovers, carpets and rugs, curtains, bedding such as sheets, pillow covers, duvets, comforters, mattress covers; linens, tablecloths, towels, washcloths, and blankets. Examples of industrial textiles include transportation (auto, airplanes, trains, buses) seats, floor mats, trunk liners, and headliners; outdoor furniture and cushions, tents, backpacks, luggage, ropes, conveyor belts, calendar roll felts, polishing cloths, rags, soil erosion fabrics and geotextiles, agricultural mats and screens, personal protective equipment, bullet proof vests, medical bandages, sutures, tapes, and the like.

The nonwoven webs that are classified as textiles do not include the category of wet laid nonwoven webs and articles made therefrom. While a variety of articles having the same function can be made from a dry or wet laid process, the article made from the dry laid nonwoven web is classified as a textile. Examples of suitable articles that may be formed from dry laid nonwoven webs as described herein can include those for personal, consumer, industrial, food service, medical, and other types of end uses. Specific examples can include, but are not limited to, baby wipes, flushable wipes, disposable diapers, training pants, feminine hygiene products such as sanitary napkins and tampons, adult incontinence pads, underwear, or briefs, and pet training pads. Other examples include a variety of different dry or wet wipes, including those for consumer (such as personal care or household) and industrial (such as food service, health care, or specialty) use.

Nonwoven webs can also be used as padding for pillows, mattresses, and upholstery, batting for quilts and comforters. In the medical and industrial fields, nonwoven webs of the present invention may be used for medical and industrial face masks, protective clothing, caps, and shoe covers, disposable sheets, surgical gowns, drapes, bandages, and medical dressings. Additionally, nonwoven webs as described herein may be used for environmental fabrics such as geotextiles and tarps, oil and chemical absorbent pads, as well as building materials such as acoustic or thermal insulation, tents, lumber and soil covers and sheeting. Nonwoven webs may also be used for other consumer end use applications, such as for, carpet backing, packaging for consumer, industrial, and agricultural goods, thermal or acoustic insulation, and in various types of apparel. The dry laid nonwoven webs as described herein may also be used for a variety of filtration applications, including transportation (e.g., automotive or aeronautical), commercial, residential, industrial, or other specialty applications. Examples can include filter elements for consumer or industrial air or liquid filters (e.g., gasoline, oil, water), including nanofiber webs used for microfiltration, as well as end uses like tea bags, coffee filters, and dryer sheets. Further, nonwoven webs as described herein may be used to form a variety of components for use in automobiles, including, but not limited to, brake pads, trunk liners, carpet tufting, and under padding.

The textiles can include a single type or multiple types of natural fibers and/or a single type or multiple types of synthetic fibers. Examples of textile fiber combinations include all natural, all synthetic, two or more types of natural fibers, two or more types of synthetic fibers, one type of natural fiber and one type of synthetic fiber, one type of natural fibers and two or more types of synthetic fibers, two or more types of natural fibers and one type of synthetic fibers, and two or more types of natural fibers and two or more types of synthetic fibers.

Natural fibers include those that are plant derived or animal derived. Natural fibers can be cellulosics, hemicellulosics, and lignins. Examples of plant derived natural fibers include hardwood pulp, softwood pulp, and wood flour; and other plant fibers including those in wheat straw, rice straw, abaca, coir, cotton, flax, hemp, jute, bagasse, kapok, *papyrus*, ramie, rattan, vine, kenaf, abaca, henequen, sisal, soy, cereal straw, bamboo, reeds, esparto grass, bagasse, Sabai grass, milkweed floss fibers, pineapple leaf fibers, switch grass, lignin-containing plants, and the like. Examples of animal derived fibers include wool, silk, mohair, cashmere, goat hair, horsehair, avian fibers, camel hair, angora wool, and alpaca wool.

Synthetic fibers are those fibers that are, at least in part, synthesized or derivatized through chemical reactions, or regenerated, and include, but are not limited to, rayon, viscose, mercerized fibers or other types of regenerated cellulose (conversion of natural cellulose to a soluble cellulosic derivative and subsequent regeneration) such as lyocell (also known as TENCEL™), Cupro, Modal, acetates such as polyvinylacetate, polyamides including nylon, polyesters such as PET, olefinic polymers such as polypropylene and polyethylene, polycarbonates, poly sulfates, polysulfones, polyethers such as polyether-urea known as Spandex or elastane, polyacrylates, acrylonitrile copolymers, polyvinylchloride (PVC), polylactic acid, polyglycolic acid, sulfopolyester fibers, and combinations thereof.

The textiles can be in any of the forms mentioned above, such as size reduction via chopping, shredding, harrowing, confrication, pulverizing, or cutting a feedstock of textiles to make size reduced textiles. The textiles can also be densified. Examples of processes that densify include those that agglomerate the textiles through heat generated by frictional forces or particles made by extrusion or other external heat applied to the textile to soften or melt a portion or all of the textile.

In some embodiments, the one or more waste plastic feedstocks can be obtained from a plastic source including, by way of example, a hopper, storage bin, railcar, over-the-road trailer, or any other device that may hold or store waste plastics. In an embodiment, the plastic source can include a municipal reclaimer facility, an industrial facility, a recycling facility, a commercial facility, a manufacturing facility, or combinations thereof.

In an illustrative embodiment, as may be combined with one or more of the preceding paragraphs, the one or more waste plastic feedstocks can contain metal contaminants such as sodium, calcium, magnesium, and aluminum, and non-metal contaminants coming from other waste sources. Non-metal contaminants include contaminants coming from the Periodic Table Group 14, such as silica, contaminants from Group 15, such as phosphorus and nitrogen compounds, contaminants from Group 16, such as sulfur compounds, and halide contaminants from Group 17, such as fluoride, chloride, bromide, and iodide. In some embodiments, the metal contaminants, non-metal contaminants, and halides can be present in the one or more waste plastic feedstocks in an amount of greater than or equal to about 100 ppm, e.g., from about 100 to about 1,000 ppm and up to about 20,000 ppm. In some embodiments, the metal contaminants can be present in the one or more waste plastic feedstocks in an amount of greater than or equal to about 1,000 ppm, e.g., from about 1,000 to about 20,000 ppm.

In some embodiments, the one or more bio feedstocks and the one or more waste plastic feedstocks can be fed into a blending unit. In some embodiments, the one or more waste plastic feedstocks can be fed into a blending unit in a solid state and mixed with the one or more bio feedstocks.

In some embodiments, as may be combined with one or more of the preceding paragraphs, the one or more bio feedstocks and the one or more waste plastic feedstocks can be fed into a blending unit simultaneously and at the same or different flow rate. In some embodiments, as may be combined with one or more of the preceding paragraphs, the one or more bio feedstocks and the one or more waste plastic feedstocks can be fed into a blending unit at different intervals and at the same or different flow rate.

In some embodiments, the blend of the one or more bio feedstocks and the one or more waste plastic feedstocks can contain from about 1 wt. % to about 20 wt. %, based on the total weight of the blend, of the one or more waste plastic feedstocks. In another illustrative embodiment, the blend can contain from about 1 wt. % to about 10 wt. %, based on the total weight of the blend, of the one or more waste plastic feedstocks. In the illustrative embodiments, the remaining amount of the blend will be composed of the one or more bio feedstocks.

In some embodiments, the blend of the one or more bio feedstocks and the one or more waste plastic feedstocks is a blend of the one or more bio feedstocks and the one or more waste plastic feedstocks in which both are an untreated one or more bio feedstocks and the one or more waste plastic feedstocks. Thus, the blend of the one or more bio feedstocks and the one or more waste plastic feedstocks which each are untreated have a lower carbon intensity relative to a blend of the one or more bio feedstocks and the one or more waste plastic feedstocks where each are pre-treated.

In some embodiments, the blend of the one or more bio feedstocks and the one or more waste plastic feedstocks is a blend of the one or more bio feedstocks and the one or more waste plastic feedstocks in which one is untreated and the other is partially treated. Partially treated means that the resulting bio feedstocks can still have substantial levels of contaminants, for example, higher than 20 ppm or higher than 50 ppm. Thus, the blend of the one or more bio feedstocks and the one or more waste plastic feedstocks will have a lower carbon intensity relative to a blend of the one or more bio feedstocks and the one or more waste plastic feedstocks where each are pre-treated.

Cracking Catalyst

In some embodiments, a deactivated cracking catalyst of the present disclosure can comprise at least about 80 wt. % (e.g., at least about 85 wt. %, at least about 90 wt. %, at least about 95 wt. %, or at least about 99 wt. %) of a phosphorus-containing ZSM-5 catalyst.

Any conventional phosphorus-containing ZSM-5 catalyst typically used in an FCC process for light olefins production may be employed in the present disclosure.

In some embodiments, a phosphorus-containing ZSM-5 catalyst may comprise (a) about 25 wt. % to about 50 wt. % (e.g., about 40 wt. % to about 50 wt. %) of ZSM-5 zeolite;

(b) about 3 wt. % to about 15 wt. % (e.g., about 5 wt. % to about 10 wt. %) of phosphorus, measured as $P_2O_5$; (c) about 5 wt. % to about 45 wt. % (e.g., about 10 wt. % to about 20 wt. %) of a clay; and (d) about 5 wt. % to about 20 wt. % (e.g., about 10 wt. % to about 20 wt. %) of a binder.

The clay may be selected from the group consisting of kaolin, halloysite, bentonite, and any combination thereof. In some aspects, the clay is kaolin.

The binder may be selected from the group consisting of a silica sol, an alumina sol, pseudoboehmite alumina, bayerite alumina, gamma-alumina, and any combination thereof.

Examples of suitable P/ZSM-5 catalysts include those commercially available from Grace (e.g., OlefinsMax®, OlefinsUltra®, OlefinsUltra® HZ, OlefinsUltra® MZ and OlefinsUltra® XZ), Johnson Matthey (e.g., INTERCAT™, PENTACAT™ HP, PROPYL MAX™, SUPER Z™, SUPER Z EXCEL, SUPER Z EXCEED, ISOCAT™, and OCTAMAX™) and BASF (e.g., ZIP Olefins Additive).

The deactivated cracking catalyst may further comprise a large-pore molecular sieve component in addition to the phosphorus-containing ZSM-5 catalyst. The large-pore molecule sieve component may comprise, for example, a FAU framework type zeolite (e.g., Y zeolite). When used, the large-pore molecular sieve component is typically present in an amount of no more than about 20 wt. % (e.g., about 0.1 wt. % to about 20 wt. %, or about 1 wt. % to about 15 wt. %), based on the weight of the cracking catalyst. Optionally, the additional molecular sieve component may further comprise matrix, binder and/or clay.

The deactivated cracking catalyst may be in the form of shaped microparticles, such as microspheres. As described, "microparticles" refer to particles having of size of from about 0.1 microns to about 100 microns. The size of a microparticle refers to the maximum length of a particle from one side to another, measured along the longest distance of the microparticle.

The deactivated cracking catalyst may be deactivated by steam treatment. Steam treatment may lead to the removal of aluminum from the framework leading to a decrease in the number of sites where framework hydrolysis can occur under hydrothermal and thermal conditions. This removal of aluminum results in an increased thermal and hydrothermal stability in dealuminated zeolites.

The steam treatment comprises steaming the catalyst under a steam and inert gas atmosphere at a temperature greater than about 500° C. (e.g., about 700° C. to about 800° C., or about 720° C. and about 740° C.). The cracking catalyst can be steam treated with 100% steam, or the steam treating step can comprise a combination of steam and inert gas. Inert gases include any inert gas that does not react with the cracking catalyst, including nitrogen and argon, or a mixture of inert gases. Steam treatment can be performed for a time period ranging from about 1 minute to about 24 hours, from about 5 minutes to about 12 hours, or from about 10 minutes to about 8 hours.

The deactivated cracking catalyst of the present disclosure may contain metal contaminants. The minimum amount of metal contaminants accumulated on the cracking catalyst can be about 500 ppm, or about 1,000 ppm, or about 2,000 ppm, or about 3,000 ppm, or about 4,000 ppm, or about 5,000 ppm; or alternatively, the maximum amount of metal contaminants accumulated on the cracking catalyst can be about 50,000 ppm, or about 45,000 ppm, or about 40,000 ppm, or about 35,000 ppm, or about 30,000 ppm, or about 25,000 ppm, or about 20,000 ppm, or about 15,000 ppm, or about 10,000 ppm. Generally, the amount of metal contaminants can be in a range from any minimum value disclosed herein to any maximum value disclosed herein. Representative contaminant metals include sodium, potassium, magnesium, calcium, vanadium, nickel, iron, and mixtures thereof.

In some embodiments, the deactivated cracking catalyst is a deactivated cracking catalyst discharged from a fluid catalytic cracking process having deactivating deposits accumulated thereon, e.g., the deactivated cracking catalyst may contain carbon-containing deposits. The carbon-containing deposits on the cracking catalyst are sometimes also referred to as coke. The minimum amount of coke on the cracking catalyst can be about 0.1 wt. %, or about 0.5 wt. %, or about 1.0 wt. %, or about 1.5 wt. %, or about 2.0 wt. %, or about 2.5 wt. %; or alternatively, the maximum amount of coke on the cracking catalyst can be about 5.0 wt. %, or about 4.5 wt. %, or about 4.0 wt. %, or about 3.5 wt. %, or about 3.0 wt. %. Generally, the amount of coke can be in a range from any minimum value disclosed herein to any maximum value disclosed herein.

In some embodiments, the deactivating deposits further comprise coke, wherein the coke is present in a range from about 0.1 wt. % to about 5.0 wt. %, based on a total weight of the deactivating cracking catalyst.

Catalytic Cracking Process

The catalytic cracking process can be carried out in, for example, a fixed bed, a moving bed or a fluidized bed and the feedstock flow may be either concurrent or countercurrent to the catalyst flow. The present catalytic cracking process is particularly applicable to fluid catalytic cracking (FCC) processes.

In non-limiting illustrative embodiments, the catalytic cracking process of the present disclosure is a fluid catalytic cracking (FCC), in which the deactivated cracking catalyst is typically a fine powder. In some embodiments, this powder is generally suspended in the feedstock stream (i.e., the blend of the one or more bio feedstocks and the one or more waste plastic feedstocks) and propelled upward in a reaction zone. The feedstock can be admixed with the deactivated cracking catalyst to provide a fluidized suspension and cracked in, for example, a reactor such as an elongated reactor, or a riser, at an elevated temperature to provide gaseous reaction products including a mixture of lighter hydrocarbon products as well as spent catalyst as discussed below. In non-limiting illustrative embodiments, the gaseous reaction products and spent catalyst are discharged from the reactor or riser and passed to a separator (e.g., a cyclone unit) located within the upper section of an enclosed stripping vessel, or stripper, with the gaseous reaction products being conveyed to a product recovery zone and the spent catalyst entering a dense catalyst bed within the lower section of the stripper. In order to remove entrained hydrocarbons from the spent catalyst prior to conveying the latter to a catalyst regenerator unit, an inert stripping gas (e.g., steam) can be passed through the catalyst bed where it desorbs such hydrocarbons conveying them to the product recovery zone. The fluidizable catalyst is continuously circulated between the riser and the regenerator and serves to transfer heat from the latter to the former thereby supplying the thermal needs of the cracking reaction which is endothermic.

Suitable catalytic cracking conditions include, for example, a temperature of from about 450° C. to about 650° C. (e.g., about 450° C. to about 600° C., or about 500° C. to about 575° C.); a pressure of from about 100 kPa to about 1100 kPa (e.g., about 200 kPa to about 400 kPa); a catalyst-to-oil mass ratio of from about 3 to about 12 (e.g., about 4 to about 11, or about 5 to about 10); and a catalyst residence time of from about 0.1 to about 15 seconds (e.g., about 0.2 to about 10 seconds).

Suitable catalyst regeneration temperatures include, for example, a temperature ranging from about 600° C. to about 800° C. at a pressure ranging from about 100 kPa to about 1100 kPa.

If desired, a mineral oil component such as those typically derived from crude oil or shale oil that has optionally been subjected to one or more separation and/or other refining processes may be combined with the one or more bio feedstocks and the one or more waste plastic feedstocks. However, given the differing cracking characteristics of the one or more bio feedstocks, the one or more waste plastic feedstocks and mineral oil feedstocks, it is normally preferred to carry out the cracking in a unit dedicated to the one or more bio feedstocks and the one or more waste plastic feedstocks cracking, i.e., a feedstock comprised entirely of the one or more bio feedstocks and the one or more waste plastic feedstocks.

In some embodiments, the processed one or more bio feedstocks and one or more waste plastic feedstocks which have been subjected to fluidized catalytic cracking conditions provide a product with a lower carbon footprint than a corresponding hydrocarbon product produced from a petroleum-based feedstock.

In some cases, the conversion of the one or more bio feedstocks and one or more waste plastics into clean fuels takes less energy than production of fuels from a virgin petroleum feedstock. As the collection and processing of the bio feedstocks and waste plastic improves, as is happening now, the gain in energy efficiencies will further improve. In those cases, fuels produced from the blend of the one or more bio feedstocks and one or more waste plastics will have lower carbon footprints than the corresponding fuels made from pure petroleum feedstock. The process of the non-limiting illustrative embodiments disclosed herein can produce clean gasoline, jet fuel and diesel with recycled contents and lower $CO_2$ (lower carbon) footprints.

The product stream, comprising cracked renewable hydrocarbons, obtained from the cracking of the one or more bio feedstocks and the one or more waste plastic feedstocks may be separated into one or more hydrocarbon fractions using, for example, a fractionator. The product stream may include dry gases (e.g., one of more of hydrogen, methane, and ethane), liquefied petroleum gases (e.g., one or more of propane and butane), light olefins (e.g., one or more of ethylene, propylene, and butylene-based olefins), gasoline (e.g., a boiling range of $C_5$ to about 221° C.), a light cycle oil (e.g., a boiling range of about 221° C.+ to about 343° C.) and heavy cycle oil (e.g., a boiling range of about 343° C.+ to final boiling temperature) Some heavier hydrocarbons may be recycled to the reactor.

In some embodiments, the processed one or more bio feedstocks and one or more waste plastic feedstocks which have been subjected to fluidized catalytic cracking conditions are separated out and sent for further processing. For example, the processed one or more bio feedstocks and one or more waste plastic feedstocks can have a variety of cracked hydrocarbon products that may be separated into two or more constituent streams by conventional means. In non-limiting illustrative embodiments, constituent streams may include a fuel gas stream, an ethylene stream, a propylene stream, a butylene stream, a naphtha stream, an olefin stream, a gasoline stream, a low cycle oil (LCO) stream, a heavy cycle oil (HCO) stream, and other hydrocarbon streams.

In some aspects, the product stream may comprise from about 30 wt. % to about 60 wt. % (e.g., from about 35 wt. % to about 50 wt. %) of gasoline boiling range hydrocarbons, as determined by ASTM D2887. In some aspects, gasoline boiling range hydrocarbons may comprise at least about 60 wt. % (e.g., at least about 65 wt. %, or about 85 wt. % to about 95 wt. %) of $C_6$ to $C_8$ aromatic compounds. The obtained gasoline fraction may be useful as high-quality renewable gasoline fuel and/or naphtha fuel, or as a blending component for these fuels.

In some aspects, the product stream may comprise xylenes with a para-xylene selectivity of from about 50% to about 99.9% (e.g., about 60% to about 97%) within the xylene fraction. Of the xylene isomers, para-xylene is of particular value since it is useful in the manufacture of terephthalic acid, which is an intermediate in the manufacture of synthetic fibers and resins.

In some aspects, the product stream may comprise at least about 25 wt. % (e.g., about 25 wt. % to about 40 wt. %, or about 30 wt. % to about 40 wt. %) $C_3$ to $C_5$ olefins, as determined by ASTM D2887. Renewable $C_3$ to $C_5$ product olefins can be directed to a petrochemical unit or to an alkylation unit to produce a bio-based high-octane gasoline by the reaction of an isoparaffin (e.g., isobutane) with one or more of the olefins (e.g., propylene and butylene).

Hydrocarbon fractions may undergo further processing before commercial use. In some aspects, a constituent stream may be further processed. In an illustrative embodiment, an olefinic constituent stream may be sent to an alkylation unit for further processing. For example, a $C_3$ olefin/paraffin mix stream of propane and propylene mix can be sent to and separated by a propane/propylene splitter (PP splitter) to produce pure streams of propane and propylene. In some embodiments, the propylene can be fed to a propylene polymerization unit to produce polypropylene.

In some embodiments, the pure propane may be fed to a propane dehydrogenation unit to make additional propylene, and then ultimately polypropylene in the propylene polymerization unit.

Dehydrogenation of propane is practiced widely in the industry to produce propylene. The reaction is endothermic, and conversion is maintained by multi-stage reactors and inter-stage heaters. The unit typically operates at high temperature (>900° F.) and low pressure (<50 psig) in the presence of noble metal (e.g., Pt) catalyst. The multi-stage process generates approximately 85% purity propylene/propane mixture. This stream is directed to a propane/propylene (PP) splitter which is a high efficiency distillation column. The splitter produces pure propylene stream with about 99.5 to about 99.8% purity.

The PP splitter unit and/or propane dehydrogenation unit can be located away from a refinery, near a refinery, or within a refinery. The propane/propylene mix is sent to the PP splitter by truck, barge, rail car or pipeline. It is preferred that the PP splitter unit and propane dehydrogenation unit are in close proximity to the refinery FCC unit.

In addition, olefins from the constituent streams may be further separated and recovered for use in renewable plastics and petrochemicals.

In some embodiments, $C_4$ and other hydrocarbon product streams, such as a heavy fraction from an FCC unit, can be sent to appropriate refinery units for upgrading into clean gasoline, diesel, or jet fuel. The gasoline from the FCC unit may be passed directly to a gasoline pool or further upgraded before being sent to a gasoline pool.

Hydrocarbon fuel products may be sold or further processed. Examples of further processing include blending, hydroprocessing, or alkylating at least a portion of the hydrocarbon fuel product. Hydrocarbon fuel products may be used as a blend stock and combined with one or more petroleum fuel products and/or renewable fuels. Petroleum-based streams include gasoline, diesel, aviation fuel, or other hydrocarbon streams obtained by refining of petroleum. Examples of renewable fuels include ethanol, propanol, and butanol.

In an illustrative embodiment, as may be combined with one or more of the preceding paragraphs, when one of the separated constituent streams is a heavy cycle oil (HCO), it can be subjected to coking followed by calcination to obtain needle coke. In an illustrative embodiment, the heavy cycle oil can be sent to a delayed coker unit as known in the art and subjected to coking under coking conditions to form an intermediate coke product. In an illustrative embodiment, the coking conditions include, for example, exposing the heavy cycle oil to a temperature ranging from about 450° C. to about 520° C. for a time period ranging from about 12 to about 24 hours.

In an illustrative embodiment, as may be combined with one or more of the preceding paragraphs, the heavy cycle oil can be subjected to coking in the presence of an aromatic polymer material followed by calcination to obtain needle coke. In an illustrative embodiment, the heavy cycle oil and the aromatic polymer material are sent to a delayed coker unit as known in the art and subjected to coking under coking conditions to form an intermediate coke product. In an illustrative embodiment, the coking conditions include, for example, exposing the heavy cycle oil and the aromatic polymer material to a temperature ranging from about 450 to about 520° C. for a time period ranging from about 12 to about 24 hours.

In an illustrative embodiment, the heavy cycle oil can be co-fed with the aromatic polymer material into the delayed coking unit. In another embodiment, a solution of the heavy cycle oil and the aromatic polymer material are fed into the delayed coking unit. For example, the solution is obtained by dissolving the aromatic polymer material in the heavy cycle oil. In an embodiment, the solution can contain from about 0.1 wt. % to about 10 wt. % of the aromatic polymer material.

In an illustrative embodiment, the aromatic polymer material includes, for example, polystyrene. Styrene is also known as ethenylbenzene, vinylbenzene, or phenylethene. The styrene-based monomer is then polymerized (facilitated by the vinyl group) to form a homo- or copolymer. For example, the styrene-based monomer is polymerized as a homopolymer to form polystyrene.

In an illustrative embodiment, as may be combined with one or more of the preceding paragraphs, the intermediate coke product obtained from the delayed coker unit is calcinated in a calciner under calcinating conditions to obtain needle coke. Suitable calcinating conditions include, for example, a temperature ranging from about 1250 to about 1400° C. and for a time period ranging from about 30 to about 60 minutes.

The following non-limiting examples are illustrative of the present disclosure.

EXAMPLE 1

Properties of Virgin Plastic Samples and Bio Feedstocks Used for Blend Preparations A commercial plastic sample, low density polyethylene (LDPE) and low molecular weight polyethylene (LMWPE) were purchased and their properties are summarized in Table 1.

TABLE 1

Properties of Virgin Plastic Used

| | LDPE | LMWPE |
|---|---|---|
| Form | Pellets | Pellets |
| Melt Index | 25 g/10 min (190° C./2.16 kg) | N/A |
| Melting Point, ° C. | 116 | 45 |
| Transition Temp, ° C. | 93, softening | N/A |
| Density, g/mL at 25° C. | 0.925 | 0.895 |

The bio feedstock used to prepare blends with the waste plastic includes tallow oil. The properties of tallow oil are shown below in Table 2.

TABLE 2

Properties of Bio Feedstock

| | Tallow |
|---|---|
| Specific Gravity | 23.2 |
| Carbon, wt. % | 76.65 |
| Hydrogen, wt. % | 12 |
| Oxygen, wt. % | 11.4 |
| H/C Molar Ratio | 1.86 |
| Iodine Number | 45 (measured) 42-48 (ref b) |
| Total S, ppm | 11 |
| Total N, ppm | 140 |
| Ni, ppm | <0.9 |
| V, ppm | <1 |
| Simdist, ° F. | |
| IBP (0.5%) | 679 |
| 5 wt % | 1062 |
| 10 wt % | 1083 |
| 30 wt % | 1099 |
| 50 wt % | 1111 |
| 70 wt % | 1113 |
| 90 wt % | 1125 |
| 95 wt % | 1134 |
| FBP (99.5%) | 1136 |

EXAMPLE 2

Catalyst Deactivation.

A phosphorus-containing ZSM-5 based catalyst was deactivated by metal impregnation as well as steaming. The phosphorus-containing ZSM-5 catalyst includes 40 wt. % of ZSM-5; 11 wt. % of phosphorus, measured as $P_2O_5$; 34 wt. % of a clay; and 15 wt. % of a binder.

Prior to use, the phosphorus-containing ZSM-5 catalyst was subjected to 50% steam treatment at 800° C. for 24 hours. In some examples prior to steaming the phosphorus-containing ZSM-5 catalysts were impregnated with metals known to poison catalysts. The metals are equal parts by weight Ca+Mg+Na+Zn, to give a final product with 1 or 2 wt. % metals, and they were added as nitrate salts using incipient wetness impregnation, which is well known in the field. After impregnation, the phosphorus-containing ZSM-5 catalysts were dried in air overnight and then calcined at 594° C. for one hour. Following calcination the materials were steamed.

EXAMPLE 3

Advanced Cracking Evaluation (ACE) Testing.

Catalytic cracking experiments were carried out using an Advanced Cracking Evaluation (ACE) Model C unit fabricated by Kayser Technology. The reactor employed in the ACE unit was a fixed fluidized reactor with 1.6 cm ID. Nitrogen was used as fluidization gas and introduced from both bottom and top. The top fluidization gas was used to carry the feed injected from a calibrated syringe feed pump via a three-way valve. The catalytic cracking of the feed was carried out at atmospheric pressure and 975° F. For each experiment, a constant amount of feed was injected at the rate of 1.2 g/min for 75 seconds. The catalyst-to-oil mass ratio was maintained at 6 for each catalyst tested. After 75 seconds of feed injection, the cracking catalyst was stripped off by nitrogen for a period of 525 seconds.

During the catalytic cracking and stripping process, the liquid product was collected in a sample vial attached to a glass receiver, which was located at the end of the reactor exit and was maintained at −15° C. The gaseous products were collected in a closed stainless-steel vessel (12.6 L) prefilled with $N_2$ at 1 atm. Gaseous products were mixed by an electrical agitator rotating at 60 rpm as soon as feed injection was completed. After stripping, the gaseous products were further mixed for 10 mins to ensure homogeneity. The final gaseous products were then analyzed using a refinery gas analyzer (RGA).

After the completion of the stripping process, in-situ catalyst regeneration was carried out in the presence of air at 1300° F. The regeneration flue gas passed through a catalytic converter packed with CuO pellets (LECO Inc.) to oxidize CO to $CO_2$. The regeneration flue gas was then analyzed by an online infrared (IR) analyzer located downstream from the catalytic converter. Coke deposited during cracking process was calculated from the $CO_2$ concentrations measured by the IR analyzer.

As mentioned above, gaseous products, mainly $C_1$ to $C_7$ hydrocarbons, were resolved in an RGA. The RGA is a customized Agilent 7890B gas chromatograph (GC) equipped with three detectors, a flame ionization detector for hydrocarbons and two thermal conductivity detectors for nitrogen and hydrogen. Gas products were grouped into dry gas ($C_2$-hydrocarbons and $H_2$) and liquefied petroleum gas ($C_3$ and $C_4$ hydrocarbons). Liquid products were weighed and analyzed in a simulated distillation GC (Agilent 6890) using ASTM D2887. The liquid products were cut into gasoline ($C_5$ to 430° F.), light cycle oil (430° F. to 650° F.) and heavy cycle oil (650° F.+). Gasoline ($C_{5+}$ hydrocarbons) in the gaseous products were combined with gasoline in the liquid products as total gasoline. Light ends in the liquid products ($C_{5-}$) were also subtracted from liquid products and added back to $C_3$ and $C_4$ species using some empirical distributions. Material balances were between 98% and 101% for most experiments.

Detailed hydrocarbon analysis (DHA) using Agilent 6890A (Separation Systems Inc.) were also performed on the gasoline portion of liquid products for PONA (paraffins, olefins, naphthenes, and aromatics) and octanes (RON and MON). DHA analysis on the gasoline portion in gaseous products was not performed. Therefore, the adjustment to total gasoline properties was not performed. Nevertheless, the DHA results still provided valuable information to evaluate catalytic cracking product properties.

The results of experiments showing the catalytic cracking of tallow oil using fresh and deactivated phosphorus-containing ZSM-5 catalysts are set forth below in Table 3.

TABLE 3

| | Feed | | | |
|---|---|---|---|---|
| Catalyst | Tallow ZSM-5 | Tallow ZSM-5 | Tallow ZSM-5 | Tallow ZSM-5 |
| Contaminant metals, ppm | 0 | 0 | 10,000 | 20,000 |
| Steam Deactivation at 800° C., hours | 0 | 24 | 24 | 24 |
| Conversion, wt. % | 96.82 | 97.02 | 96.64 | 95.80 |
| Temperature (F.) | 975.00 | 975.00 | 975.00 | 975.00 |
| Cat/Oil, wt./wt. | 6.00 | 6.00 | 6.00 | 6.00 |
| Yields, wt. % | | | | |
| Coke | 1.25 | 1.11 | 1.29 | 1.64 |
| Dry Gas | 5.66 | 5.36 | 4.16 | 3.50 |
| Hydrogen | 0.04 | 0.02 | 0.03 | 0.03 |
| Methane | 0.25 | 0.21 | 0.27 | 0.26 |
| Ethane | 0.18 | 0.15 | 0.11 | 0.13 |
| Ethylene | 5.19 | 4.97 | 3.75 | 3.09 |
| LPG | 35.66 | 36.33 | 34.33 | 33.67 |
| Propane | 2.01 | 1.75 | 0.83 | 0.54 |
| Propylene | 17.06 | 17.35 | 16.62 | 16.29 |
| n-Butane | 0.71 | 0.67 | 0.37 | 0.26 |
| Isobutane | 0.92 | 0.92 | 0.49 | 0.30 |
| C4 Olefins | 14.97 | 15.64 | 16.02 | 16.28 |
| Standard cut gasoline (C5 - 430° F.) | 40.95 | 41.04 | 43.56 | 43.47 |
| LCO (430-650° F.) | 2.37 | 2.29 | 2.47 | 2.87 |
| HCO (650° F.+) | 0.81 | 0.69 | 0.89 | 1.33 |
| CO | 4.49 | 4.27 | 4.12 | 4.03 |
| $CO_2$ | 0.43 | 0.45 | 0.55 | 0.73 |
| $H_2O$ | 8.37 | 8.46 | 8.62 | 8.77 |
| Gasoline n-Paraffins, wt. % | 1.94 | 2.09 | 2.40 | 2.65 |
| Gasoline iso-paraffins, wt. % | 3.41 | 3.85 | 4.99 | 6.24 |
| Gasoline aromatics, wt. % | 78.02 | 76.42 | 71.37 | 64.25 |
| Gasoline naphthenes, wt. % | 34.21 | 3.15 | 4.30 | 4.54 |
| Gasoline olefins, wt. % | 13.08 | 14.17 | 16.46 | 21.43 |
| RON-GC | 116.77 | 112.50 | 107.82 | 107.17 |
| MON-GC | 93.29 | 92.34 | 90.28 | 88.29 |
| (R + M)/2 | 105.03 | 102.42 | 99.05 | 97.73 |
| Benzene | 6.35 | 4.62 | 3.58 | 3.49 |
| Toluene | 26.24 | 22.10 | 18.06 | 16.28 |
| Ethylbenzene | 6.05 | 6.85 | 6.67 | 6.00 |
| m-Xylene | 2.47 | 2.42 | 1.81 | 0.48 |
| p-Xylene | 19.73 | 20.71 | 18.68 | 18.11 |
| o-Xylene | 0.79 | 0.91 | 0.74 | 0.28 |
| Total xylenes | 22.98 | 24.04 | 21.23 | 18.86 |
| % of p-xylene | 86% | 86% | 88% | 96% |
| C3=/C3 | 89% | 91% | 95% | 97% |
| C4=/C4 | 90% | 91% | 95% | 97% |
| C4=/C3= | 0.88 | 0.90 | 0.96 | 1.00 |

The results of experiments showing the catalytic cracking of a blend of tallow oil and LMWPE using fresh and deactivated phosphorus-containing ZSM-5 catalysts are set forth below in Table 4.

TABLE 4

| | Feed | | | |
|---|---|---|---|---|
| Catalyst | Tallow + 10% LMWPE ZSM-5 | Tallow + 10% LMWPE ZSM-5 | Tallow + 10% LMWPE ZSM-5 | Tallow + 10% LMWPE ZSM-5 |
| Contaminant metals, ppm | 0 | 0 | 10,000 | 20,000 |

TABLE 4-continued

| Catalyst | Feed: Tallow + 10% LMWPE ZSM-5 | Tallow + 10% LMWPE ZSM-5 | Tallow + 10% LMWPE ZSM-5 | Tallow + 10% LMWPE ZSM-5 |
|---|---|---|---|---|
| Steam Deactivation at 800° C., hours | 0 | 24 | 24 | 24 |
| Conversion, wt. % | 97.32 | 97.34 | 96.57 | 95.58 |
| Temperature (F.) | 975.00 | 975.00 | 975.00 | 975.00 |
| Cat/Oil, wt./wt. | 6.00 | 6.00 | 6.00 | 6.00 |
| Yields, wt. % | | | | |
| Coke | 1.11 | 1.01 | 1.11 | 1.33 |
| Dry Gas | 5.61 | 5.26 | 4.04 | 3.39 |
| Hydrogen | 0.04 | 0.03 | 0.03 | 0.03 |
| Methane | 0.25 | 0.22 | 0.24 | 0.23 |
| Ethane | 0.20 | 0.15 | 0.11 | 0.13 |
| Ethylene | 5.12 | 4.86 | 3.66 | 3.00 |
| LPG | 37.69 | 37.57 | 35.68 | 34.79 |
| Propane | 2.31 | 1.87 | 0.91 | 0.60 |
| Propylene | 17.45 | 17.63 | 16.95 | 16.57 |
| n-Butane | 0.84 | 0.74 | 0.42 | 0.30 |
| Isobutane | 1.13 | 1.02 | 0.58 | 0.38 |
| C4 Olefins | 15.96 | 16.31 | 16.82 | 16.92 |
| Standard cut gasoline (C5 - 430 F.) | 41.03 | 41.59 | 44.06 | 44.26 |
| LCO (430-650 F.) | 1.88 | 1.90 | 2.40 | 2.86 |
| HCO (650 F.+) | 0.79 | 0.77 | 1.03 | 1.56 |
| CO | 3.87 | 3.76 | 3.51 | 3.48 |
| $CO_2$ | 0.43 | 0.46 | 0.58 | 0.72 |
| $H_2O$ | 7.59 | 7.69 | 7.59 | 7.61 |
| Gasoline n-Paraffins, wt. % | 2.39 | 2.35 | 2.78 | 3.01 |
| Gasoline Iso-paraffins, wt. % | 4.01 | 3.88 | 5.55 | 6.49 |
| Gasoline aromatics, wt. % | 72.97 | 73.68 | 66.49 | 61.56 |
| Gasoline naphthenes, wt. % | 3.51 | 3.09 | 4.10 | 4.36 |
| Gasoline olefins, wt. % | 16.44 | 16.46 | 20.40 | 23.70 |
| RON-GC | 118.19 | 114.07 | 109.47 | 107.20 |
| MON-GC | 92.17 | 91.92 | 89.39 | 87.79 |
| (R + M)/2 | 105.18 | 103.00 | 99.43 | 97.50 |
| Benzene | 7.12 | 5.01 | 3.84 | 3.64 |
| Toluene | 19.52 | 22.98 | 18.19 | 17.07 |
| Ethylbenzene | 6.37 | 6.46 | 6.28 | 5.78 |
| m-Xylene | 2.74 | 2.42 | 1.76 | 0.48 |
| p-Xylene | 21.12 | 20.24 | 17.93 | 17.68 |
| o-Xylene | 0.85 | 0.89 | 0.70 | 0.26 |
| Total xylenes | 24.70 | 23.55 | 20.39 | 18.42 |
| % of p-Xylene | 85% | 86% | 88% | 96% |
| C3=/C3 | 88% | 90% | 95% | 96% |
| C4=/C4 | 89% | 90% | 94% | 96% |
| C4=/C3= | 0.91 | 0.92 | 0.99 | 1.02 |

The results of the experiments showing the catalytic cracking of a blend of tallow oil and LDPE using fresh and deactivated phosphorus-containing ZSM-5 catalysts are set forth below in Table 5.

TABLE 5

| Catalyst | Feed: Tallow + 10% LDPE ZSM-5 | Tallow + 10% LDPE ZSM-5 | Tallow + 10% LDPE ZSM-5 | Tallow + 10% LDPE ZSM-5 |
|---|---|---|---|---|
| Contaminant metals, ppm | 0 | 0 | 10,000 | 20,000 |
| Steam Deactivation at 800° C., hours | 0 | 24 | 24 | 24 |
| Conversion, wt. % | 97.23 | 96.74 | 96.50 | 94.32 |
| Temperature (F.) | 975.00 | 975.00 | 975.00 | 975.00 |
| Cat/Oil, wt./wt. | 6.00 | 6.00 | 6.00 | 6.00 |

TABLE 5-continued

| Catalyst | Feed: Tallow + 10% LDPE ZSM-5 | Tallow + 10% LDPE ZSM-5 | Tallow + 10% LDPE ZSM-5 | Tallow + 10% LDPE ZSM-5 |
|---|---|---|---|---|
| Yields, wt. % | | | | |
| Coke | 1.81 | 1.55 | 1.68 | 2.05 |
| Dry Gas | 6.19 | 5.56 | 4.37 | 3.51 |
| Hydrogen | 0.05 | 0.03 | 0.03 | 0.03 |
| Methane | 0.28 | 0.22 | 0.22 | 0.26 |
| Ethane | 0.22 | 0.16 | 0.12 | 0.15 |
| Ethylene | 5.64 | 5.14 | 4.00 | 3.07 |
| LPG | 38.49 | 37.48 | 36.81 | 34.11 |
| Propane | 2.42 | 1.91 | 0.98 | 0.62 |
| Propylene | 18.06 | 17.77 | 17.74 | 16.43 |
| n-Butane | 0.90 | 0.77 | 0.45 | 0.30 |
| Isobutane | 1.17 | 1.05 | 0.61 | 0.35 |
| C4 Olefins | 15.93 | 15.99 | 17.03 | 16.42 |
| Standard cut gasoline (C5 - 430° F.) | 38.60 | 40.63 | 42.22 | 42.90 |
| LCO (430-650° F.) | 1.76 | 2.06 | 2.39 | 3.50 |
| HCO (650° F.+) | 1.01 | 1.20 | 1.11 | 2.18 |
| CO | 3.99 | 3.67 | 3.47 | 3.41 |
| $CO_2$ | 0.38 | 0.40 | 0.50 | 0.67 |
| $H_2O$ | 7.79 | 7.46 | 7.44 | 7.66 |
| Gasoline n-Paraffins, wt. % | 2.19 | 2.29 | 2.79 | 3.13 |
| Gasoline Iso-paraffins, wt. % | 3.28 | 3.70 | 5.10 | 6.10 |
| Gasoline aromatics, wt. % | 76.34 | 70.73 | 69.08 | 63.61 |
| Gasoline naphthenes, wt. % | 3.09 | 3.12 | 3.89 | 4.28 |
| Gasoline olefins, wt. % | 14.40 | 14.53 | 18.44 | 22.06 |
| RON-GC | 118.44 | 105.75 | 108.94 | 106.84 |
| MON-GC | 93.03 | 87.11 | 89.74 | 88.13 |
| (R + M)/2 | 105.74 | 96.43 | 99.34 | 97.49 |
| Benzene | 6.93 | 4.78 | 3.82 | 3.50 |
| Toluene | 27.61 | 17.49 | 18.66 | 16.80 |
| Ethylbenzene | 5.93 | 6.88 | 6.60 | 5.91 |
| m-Xylene | 2.21 | 2.23 | 1.57 | 0.47 |
| p-Xylene | 19.85 | 21.45 | 18.94 | 18.40 |
| o-Xylene | 0.68 | 0.84 | 0.64 | 0.27 |
| Total Xylenes | 22.73 | 24.52 | 21.15 | 19.14 |
| % of p-Xylene | 87% | 87% | 90% | 96% |
| C3=/C3 | 88% | 90% | 95% | 96% |
| C4=/C4 | 89% | 90% | 94% | 96% |
| C4=/C3= | 0.88 | 0.90 | 0.96 | 1.00 |

As can be seen from the results in Tables 4 and 5, a phosphorus-containing ZSM-5 catalyst is a very robust catalyst for the catalytic cracking of blends containing dissolved bio feedstocks and waste plastics. In addition, it is also seen that further deactivation can improve the phosphorus-containing ZSM-5 catalyst by changing the product selectivities with little loss in activity.

According to an aspect of the present disclosure, a process, comprises:

contacting one or more bio feedstocks and one or more waste plastic feedstocks with a deactivated cracking catalyst comprising a phosphorus-containing ZSM-5 catalyst at catalytic cracking conditions to obtain a product stream comprising hydrocarbons, and separating at least one hydrocarbon fraction from the product stream; wherein the deactivated cracking catalyst contains at least one metal contaminant.

In an illustrative embodiment, as may be combined with one or more of the preceding paragraphs, the one or more bio feedstocks comprise plant-derived oils and/or animal-derived fats and oils.

In an illustrative embodiment, as may be combined with one or more of the preceding paragraphs, the one or more bio feedstocks comprise palm oil, tallow, soybean oil or a mixture thereof.

In an illustrative embodiment, as may be combined with one or more of the preceding paragraphs, the one or more waste plastic feedstocks comprise one or more polyesters, one or more polyolefins and combinations thereof.

In an illustrative embodiment, as may be combined with one or more of the preceding paragraphs, the one or more waste plastic feedstocks comprise one of a polyethylene or polypropylene waste plastic.

In an illustrative embodiment, as may be combined with one or more of the preceding paragraphs, the contacting the one or more bio feedstocks and the one or more waste plastic feedstocks with the deactivated cracking catalyst comprises contacting a blend of the one or more bio feedstocks and the one or more waste plastic feedstocks with the deactivated cracking catalyst.

In an illustrative embodiment, as may be combined with one or more of the preceding paragraphs, the blend comprises from about 1 wt. % to about 20 wt. %, based on the total weight of the blend, of the one or more waste plastic feedstocks.

In an illustrative embodiment, as may be combined with one or more of the preceding paragraphs, the one or more bio feedstocks comprise one of a soybean oil or tallow and the one or more waste plastic feedstocks comprise one of a polyethylene or polypropylene waste plastic.

In an illustrative embodiment, as may be combined with one or more of the preceding paragraphs, the one or more bio feedstocks and the one or more waste plastic feedstocks are untreated.

In an illustrative embodiment, as may be combined with one or more of the preceding paragraphs, the at least one metal contaminant comprises a metal selected from sodium, potassium, magnesium, calcium, vanadium, nickel, iron, or a mixture thereof.

In an illustrative embodiment, as may be combined with one or more of the preceding paragraphs, the deactivated cracking catalyst has an accumulation of at least about 500 parts per million (ppm) of the at least one metal contaminant, and up to about 50,000 ppm of the at least one metal contaminant.

In an illustrative embodiment, as may be combined with one or more of the preceding paragraphs, the deactivated cracking catalyst has been subjected to a steam treatment.

In an illustrative embodiment, as may be combined with one or more of the preceding paragraphs, the steam treatment is carried out under a steam and inert gas atmosphere at a temperature of at least about 500° C.

In an illustrative embodiment, as may be combined with one or more of the preceding paragraphs, the deactivated cracking catalyst is a deactivated cracking catalyst discharged from a fluid catalytic cracking process having deactivating deposits accumulated thereon.

In an illustrative embodiment, as may be combined with one or more of the preceding paragraphs, the deactivating deposits further comprise coke, wherein the coke is present in a range from about 0.1 wt. % to about 5.0 wt. %, based on a total weight of the deactivating cracking catalyst.

In an illustrative embodiment, as may be combined with one or more of the preceding paragraphs, the phosphorus-containing ZSM-5 catalyst comprises:

about 25 wt. % to about 50 wt. % of ZSM-5, about 3 wt. % to about 15 wt. % of phosphorus, measured as $P_2O_5$, about 5 wt. % to about 45 wt. % of a clay, and about 5 wt. % to about 20 wt. % of a binder.

In an illustrative embodiment, as may be combined with one or more of the preceding paragraphs, the catalytic cracking conditions comprise a temperature of from about 450° C. to about 650° C.; a pressure of from about 100 kPa to about 1100 kPa; a catalyst-to-oil mass ratio of from about 3 to about 12; and a catalyst residence time of from about 0.1 to about 15 seconds.

In an illustrative embodiment, as may be combined with one or more of the preceding paragraphs, the process further comprises fractionating the product stream into one or more hydrocarbon fractions.

In an illustrative embodiment, as may be combined with one or more of the preceding paragraphs, the at least one hydrocarbon fraction from the product stream comprises one or more of $C_3$ to $C_5$ olefins and $C_6$ to $C_8$ aromatics.

In an illustrative embodiment, as may be combined with one or more of the preceding paragraphs, the at least one hydrocarbon fraction from the product stream comprises from about 30 wt. % to about 60 wt. % of gasoline boiling range hydrocarbons.

Various features disclosed herein are, for brevity, described in the context of a single embodiment, but may also be provided separately or in any suitable sub-combination. All combinations of the embodiments are specifically embraced by the illustrative embodiments disclosed herein just as if each and every combination was individually and explicitly disclosed. In addition, all sub-combinations listed in the embodiments describing such variables are also specifically embraced by the present compositions and are disclosed herein just as if each and every such sub-combination was individually and explicitly disclosed herein.

It will be understood that various modifications may be made to the embodiments disclosed herein. Therefore, the above description should not be construed as limiting, but merely as exemplifications of preferred embodiments. For example, the functions described above and implemented as the best mode for operating the present invention are for illustration purposes only. Other arrangements and methods may be implemented by those skilled in the art without departing from the scope and spirit of this invention. Moreover, those skilled in the art will envision other modifications within the scope and spirit of the claims appended hereto.

What is claimed is:

1. A process, comprising:

generating a deactivated cracking catalyst comprising a phosphorus-containing ZSM-5 catalyst having deactivating deposits accumulated thereon discharged from a fluid catalytic cracking process, the deactivating deposits comprising about 0.1 wt. % to about 5.0 wt. %, based on a total weight of the deactivating cracking catalyst, of coke, the deactivated cracking catalyst further comprising at least one metal contaminant;

contacting one or more bio feedstocks and one or more waste plastic feedstocks with the deactivated cracking catalyst at catalytic cracking conditions to obtain a product stream comprising hydrocarbons; and separating at least one hydrocarbon fraction from the product stream.

2. The process according to claim 1, wherein the one or more bio feedstocks comprise plant-derived oils and/or animal-derived fats and oils.

3. The process according to claim 1, wherein the one or more bio feedstocks comprise palm oil, tallow, soybean oil or a mixture thereof.

4. The process according to claim 1, wherein the one or more waste plastic feedstocks comprise one or more polyesters, one or more polyolefins and combinations thereof.

5. The process according to claim 1, wherein the one or more waste plastic feedstocks comprise one of a polyethylene or polypropylene waste plastic.

6. The process according to claim 1, wherein the contacting the one or more bio feedstocks and the one or more waste plastic feedstocks with the deactivated cracking catalyst comprises contacting a blend of the one or more bio feedstocks and the one or more waste plastic feedstocks with the deactivated cracking catalyst.

7. Process according to claim 6, wherein the blend comprises from about 1 wt. % to about 20 wt. %, based on the total weight of the blend, of the one or more waste plastic feedstocks.

8. The process according to claim 1, wherein the one or more bio feedstocks comprise one of a soybean oil or tallow and the one or more waste plastic feedstocks comprise one of a polyethylene or polypropylene waste plastic.

9. The process according to claim 1, wherein the one or more bio feedstocks and the one or more waste plastic feedstocks are untreated.

10. The process according to claim 1, wherein the at least one metal contaminant comprises a metal selected from sodium, potassium, magnesium, calcium, vanadium, nickel, iron, or a mixture thereof.

11. The process according to claim 1, wherein the deactivated cracking catalyst has an accumulation of at least about 500 parts per million (ppm) of the at least one metal contaminant, and up to about 50,000 ppm of the at least one metal contaminant.

12. The process according to claim 1, wherein the deactivated cracking catalyst has been subjected to a steam treatment.

13. The process according to claim 12, wherein the steam treatment is carried out under a steam and inert gas atmosphere at a temperature of at least about 500° C.

14. The process according to claim 1, wherein the phosphorus-containing ZSM-5 catalyst comprises:

about 25 wt. % to about 50 wt. % of ZSM-5;

about 3 wt. % to about 15 wt. % of phosphorus, measured as $P_2O_5$;

about 5 wt. % to about 45 wt. % of a clay; and about 5 wt. % to about 20 wt. % of a binder.

15. The process according to claim 1, wherein the catalytic cracking conditions comprise a temperature of from about 450° C. to about 650° C.; a pressure of from about 100 kPa to about 1100 kPa; a catalyst-to-oil mass ratio of from about 3 to about 12; and a catalyst residence time of from about 0.1 to about 15 seconds.

16. The process according to claim 1, further comprising fractionating the product stream into one or more hydrocarbon fractions.

17. The process according to claim 1, wherein the at least one hydrocarbon fraction from the product stream comprises one or more of $C_3$ to $C_5$ olefins and $C_6$ to $C_8$ aromatics.

18. The process according to claim 1, wherein the at least one hydrocarbon fraction from the product stream comprises from about 30 wt. % to about 60 wt. % of gasoline boiling range hydrocarbons.

19. The process according to claim 1, wherein the deactivated catalyst comprises at least 90 wt. % of the phosphorus-containing ZSM-5 catalyst.

20. The process according to claim 1, wherein the deactivated catalyst is steam-treated.

* * * * *